United States Patent
Burk

(10) Patent No.: US 6,539,697 B2
(45) Date of Patent: Apr. 1, 2003

(54) APPARATUS AND METHOD FOR KNOCKING DOWN AND CRUSHING FARM CROP RESIDUE

(76) Inventor: Carl A. Burk, 8686 Webster Rd., Freeland, MI (US) 48623

(*) Notice: Subject to any disclaimer, the term of this patent is extended or adjusted under 35 U.S.C. 154(b) by 0 days.

(21) Appl. No.: 09/790,709

(22) Filed: Feb. 22, 2001

(65) Prior Publication Data
US 2002/0112461 A1 Aug. 22, 2002

(51) Int. Cl.$^7$ .............................................. A01D 49/00
(52) U.S. Cl. ....................................................... 56/504
(58) Field of Search ......................... 56/500, 504, 505, 56/502, 192, 344, 365, 370; 460/111–113; 172/45, 63, 176, 181

(56) References Cited

U.S. PATENT DOCUMENTS

| | | |
|---|---|---|
| 26,084 A | 11/1859 | Brownell |
| 335,949 A * | 2/1886 | Olson et al. ................ 56/500 |
| 508,906 A | 11/1893 | Allingham |
| 630,947 A | 8/1899 | Terrell |
| 993,001 A | 5/1911 | Vail |
| 1,059,404 A | 4/1913 | Spiva |
| 1,156,234 A | 10/1915 | Jones |
| 1,371,992 A | 3/1921 | Harper |
| 3,802,172 A * | 4/1974 | Mathews ................... 56/15.8 |
| 4,077,190 A * | 3/1978 | Crites ........................ 56/12.7 |
| 5,103,624 A * | 4/1992 | Marshall ..................... 56/192 |
| 5,329,754 A | 7/1994 | Fuesz ......................... 56/504 |
| 5,901,541 A * | 5/1999 | Lindquist .................... 56/504 |
| 5,953,895 A | 9/1999 | Hobbs ......................... 56/500 |
| 6,101,800 A | 8/2000 | Juraco ........................ 56/504 |

* cited by examiner

Primary Examiner—Robert E. Pezzuto
(74) Attorney, Agent, or Firm—John J. Swartz

(57) ABSTRACT

Apparatus and method for crushing plant residue remaining in a farm field following the crop harvest comprising a main frame moveable in a forward path, a yieldable residue knock-down drape suspended on the frame for knocking the plant residue to the ground and breaking the upstanding plant residue apart from its underground roots as the frame forwardly moves, and a transversely disposed residue crushing roller mounted on the frame rearwardly of the knock-down drape for crushing spaced-apart portions of the knock-down residue into a plurality of smaller crop residue segments.

60 Claims, 8 Drawing Sheets

APPARATUS AND METHOD FOR KNOCKING DOWN AND CRUSHING FARM CROP RESIDUE

BACKGROUND OF THE INVENTION

1. Field of the Invention

This invention relates to a farm implement and more particularly to apparatus and method for breaking above-ground farm crop residue following harvest into a plurality of reduced crop residue segments.

2. Description of Prior Art and Objects

The harvesting of farm crop, such as corn, with a combine or a corn picker results in the harvested corn stalks remaining upright in the field. The remaining upright stalks cause difficulty in subsequently tilling the soil and interferes with the harvesting of following crops. Sometimes, the farmer will plow the field to turn over and bury the remaining corn stalks. If the stalks are too long, the furrows won't cover the stalks.

When a farmer follows a field of harvested corn with a crop of navy beans, for example, it is important in cold climates to plow in the fall of the year to maximize the nutrients in the soil for the following spring planting. If the corn stalks are allowed to remain in their normal harvested length when the field is plowed, the non-buried portion of the stalks do not totally deteriorate, and therefore the nutrients in the soil are not as numerous as they otherwise would be. Accordingly, it is an object of the present invention to provide new and novel apparatus which will enhance the amount of nutrients in plowed soil.

For "minimum-till" farming, chisel plows are used to turn the top soil, however, even more of the stalks remain above ground because "minimum till" furrows aren't as large as plowed furrows.

In so-called "no-till" farming, the farmer does not till the soil and a substantial amount of remaining upstanding stalks pass through the combine which is harvesting the following crop thereby adding to the deterioration of the cutting blade and the combine. Accordingly, it is another object of the present invention to provide new and novel apparatus for leveling farm crop residue to preclude the residue from being harvested with a following crop.

The prior art includes so-called "flail choppers" which have rotary blades that are mounted on a tractor drawn frame and driven by a power take off coupled to the tractor. A substantial amount of energy is required to drive the flail choppers and thus a substantial amount of expensive fuel is expended. Accordingly, it is yet another object of the present invention to provide apparatus for breaking farm crop residue into smaller pieces in a more efficient and less expensive manner.

It is a further object of the present invention to provide apparatus of the type described which incorporates a self-propelled rotary stalk crusher.

U.S. Pat. No. 5,329,574 issued to William P. Fuesz on Jul. 19, 1994, is directed to a machine for chopping crop residue including a relatively complicated system with many moving parts. It has been found advantageous to reorient the upstanding stalks by pushing them forwardly and downwardly and to break the stalks from the underlying ground embedded roots prior to chopping the residue into smaller stalk segments. Accordingly, it is still another object of the present invention to provide a farm crop residue machine which includes a new and novel apparatus mounted on the frame for reorienting the upstanding corn stalks prior to crushing them into pieces.

It is a still further object of the present invention to provide new and novel apparatus of the type described for forwardly bending the stalks prior to crushing them into smaller stalk segments.

It is another object of the present invention to provide new and novel apparatus for knocking down the upstanding farm crop and breaking it from the underlying roots.

It is a further object of the present invention to provide new and novel method and apparatus of the type described including a drape for dragging over and knocking down the upright corn stalks prior to crushing them into smaller stalk segments.

U.S. Pat. No. 5,953,895 issued to Oliver K. Hobbs on Sep. 21, 1999, is directed to apparatus for processing plant stalks after harvesting, however, rather than breaking the upstanding stalks from the underground roots, this patented construction pulls the stalks and the attached roots from the ground and thus tills the soil contrary to the typical no-till farming operation. Accordingly, it is another object of the present invention to provide method and apparatus for breaking upstanding plant residue apart from the underlying roots into a plurality of plant residue segments without tilling the soil.

It is yet another object of the present invention to provide new and novel method and apparatus for breaking the stalks from the underlying roots prior to crushing them with a new and novel stalk crushing roller.

Still another object of the present invention is to provide new and novel apparatus of the type described including a new and novel flexible residue knock-down drape disposed forwardly of, and in spaced relation with, a new and novel residue crushing roller.

A further object of the present invention is to provide apparatus of the type described including a new and novel residue crushing roller having a drum mounting a plurality of solid crushing blades circumferentially spaced about the outer surface of the drum.

Different soil conditions will provide different resistance to crushing of the crop residue. Some soil dictates that more force be exerted on the stalk to crush it into smaller stalk segments. Accordingly, it is a still further object of the present invention to provide apparatus of the type described which can crush stalks in a variety of different soils and soil conditions.

Another object of the present invention is to provide farm crop residue crushing apparatus of the type described including a hollow drum having a hollow cylinder provided with end wall closures adapted to receive liquid therein to control the weight of the drum and selectively crush different stalks with a variety of forces in a variety of soil conditions.

Another object of the present invention is to provide new and novel apparatus of the type described including mechanism for mounting a crop residue crushing roller on the frame for vertical movement relative thereto to allow the crusher roller to adapt to the terrain of varying elevations.

Another object of the present invention is to provide apparatus of the type described including apparatus for yieldably maintaining a stalk crushing roller in bearing engagement with the soil so that rotation of the crushing roller will be self-propelled in response to the apparatus moving forwardly.

U.S. Pat. No. 6,101,800 issued to Albert F. Juraco, et al on Aug. 15, 2000, is directed to field chopping apparatus mounted on the wheels of a tractor for harvesting laterally spaced-apart rows of male corn plants in a hybrid corn producing field. Accordingly, it is yet another object of the present invention to provide a farm crop residue crushing apparatus of the type described including a knock-down mechanism spanning a plurality of rows of crop residue and a crusher roller mounted on the frame behind the roller and spanning the plurality of rows and having continuous chopping blades thereon spanning the plurality of rows.

These and other objects of the present invention will become more readily apparent as the description thereof proceeds:

SUMMARY OF THE INVENTION

Apparatus for crushing upstanding stalk residue in a plurality of longitudinally extending laterally adjacent rows of stalk residue, which have ground-embedded roots, following harvesting of crop from the stalk residue, the apparatus comprising: a main frame adapted to be supported on the ground for movement in a forward path of travel, knock-down apparatus for knocking down the upstanding stalk residue, and apparatus, rearwardly spaced from the knock-down apparatus, for breaking the knocked down stalk residue into a plurality of smaller stalk segments including a transversely extending ground engaging crusher roller for spanning a plurality of adjacent rows of stalks, and a plurality of transversely disposed, radially outwardly extending crusher blades mounted on the crusher roller and adapted to span the plurality of adjacent rows for downwardly crushing spaced-apart portions of the stalks against the ground until the resistance of the ground causes the stalks in the several adjacent rows to be concurrently broken into smaller pieces by the crusher blades.

DESCRIPTION OF THE DRAWINGS

The invention may be more readily understood by reference to the accompanying drawings, in which.

DESCRIPTION OF PREFERRED EMBODIMENT

Figure 1:
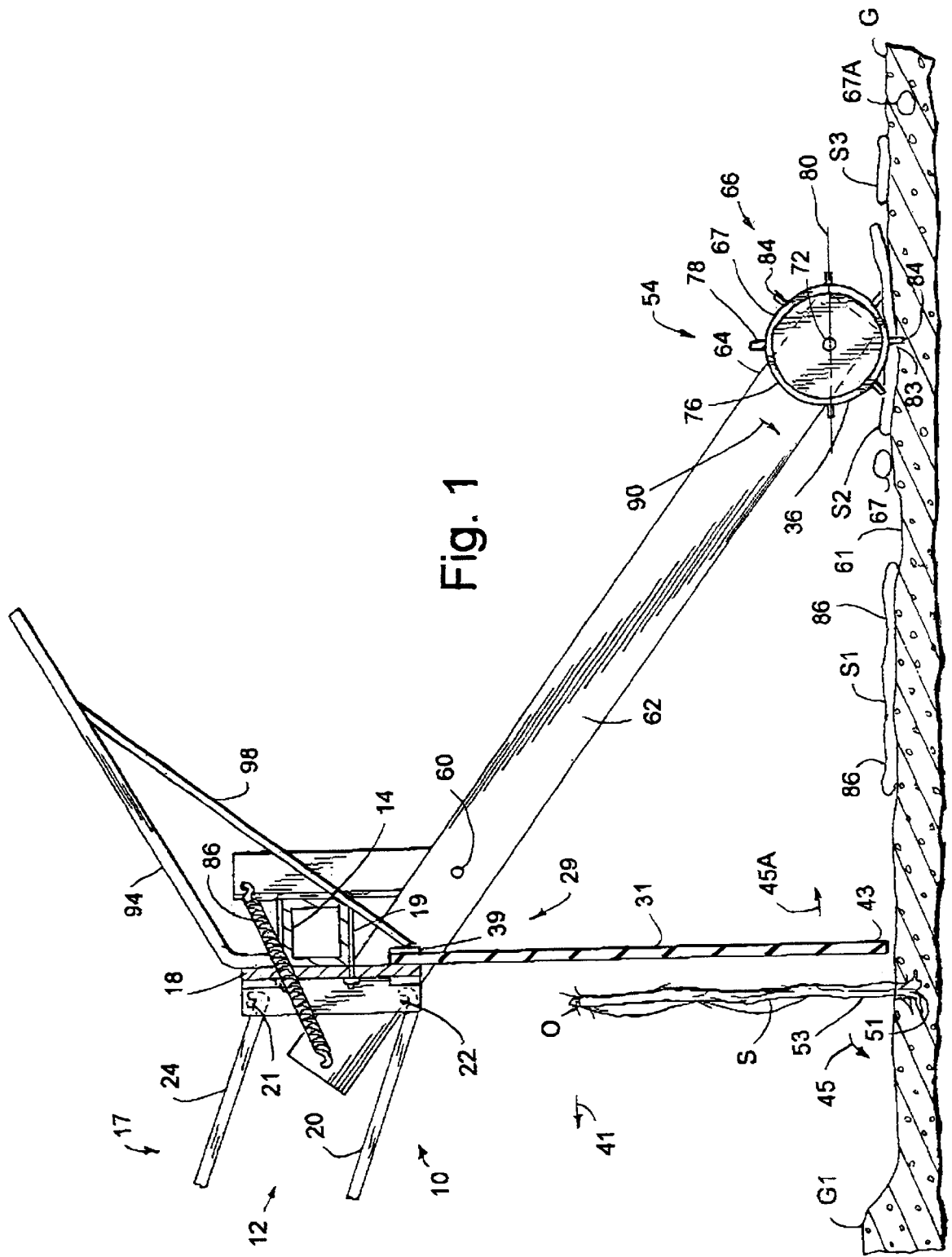
FIG. 1 is a sectional side view of apparatus constructed according to the present invention, taken along the section line 1—1 of FIG. 2; with the stalk crushing roller illustrated in chain lines in an elevated position to accommodate varying terrain being traversed.
Figure 3:
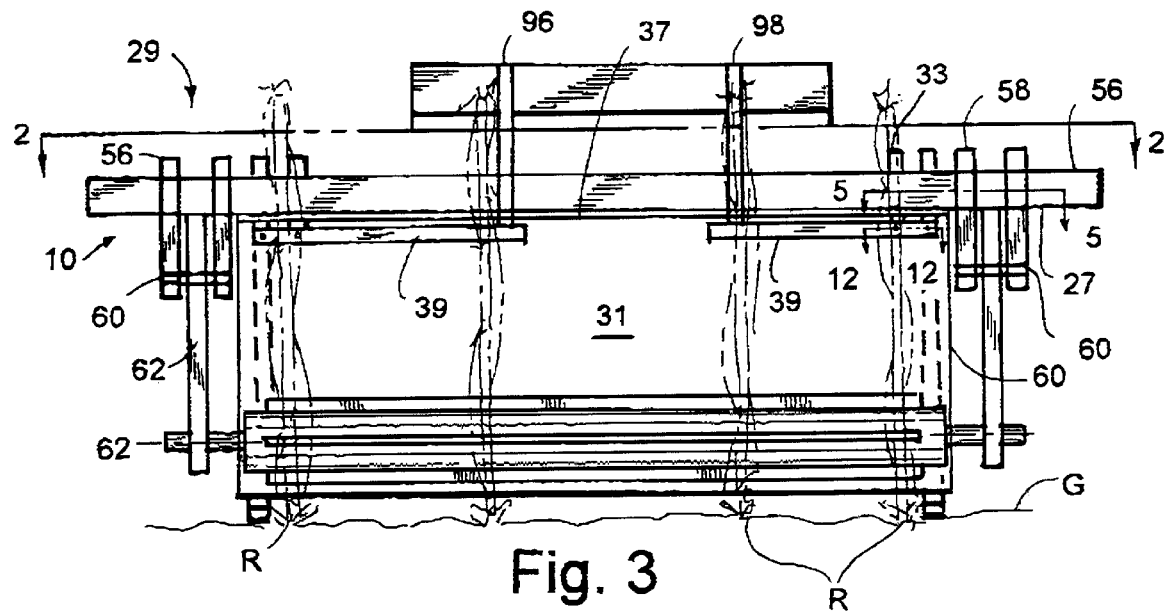
FIG. 3 is a rear elevational view thereof.
Figure 2:
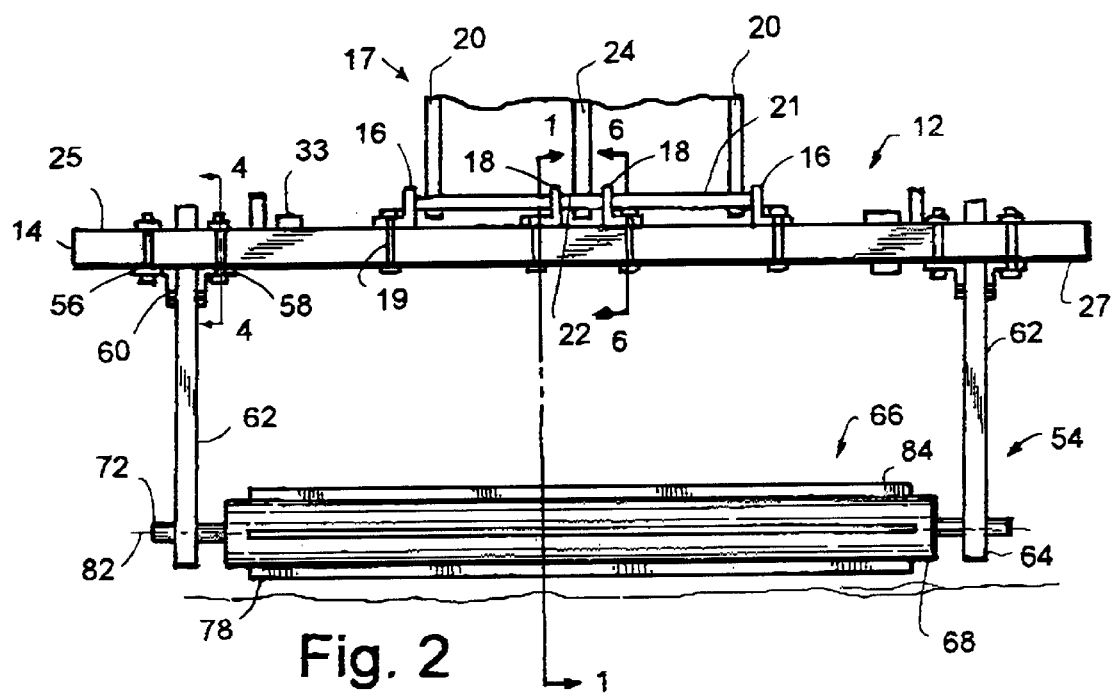
FIG. 2 is a reduced, top plan view of the apparatus illustrated in FIG. 1.
Figure 4:
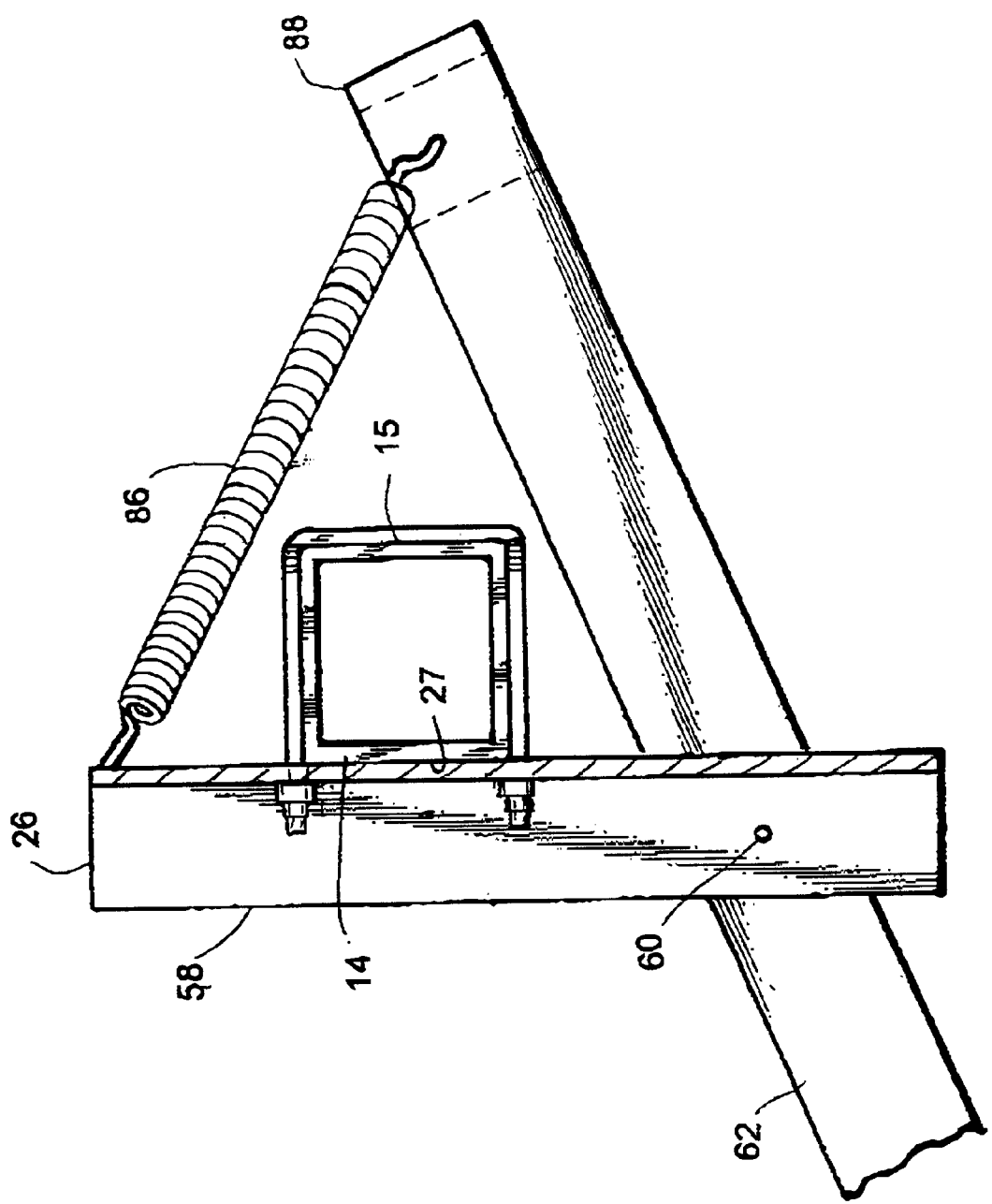
FIG. 4 is an enlarged opposite end sectional view at one end of the apparatus, taken along the section line 4—4 of FIG. 2, to more particularly illustrate the pivotal sub-frame for mounting the stalk crushing roller.
Figure 5:
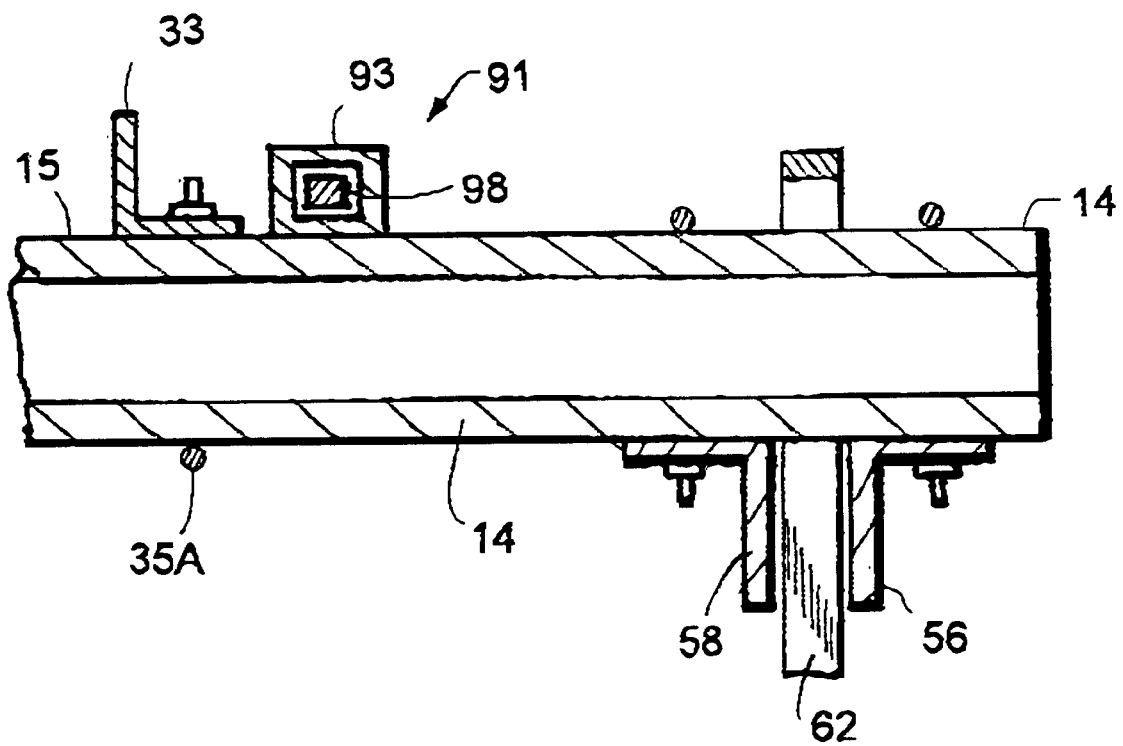
FIG. 5 is a further enlarged top plan fragmentary sectional view, taken along the section line 5—5 of FIG. 2 to better illustrate a storage stand for supporting the apparatus when the apparatus is not mounted on a tractor.
Figure 6:
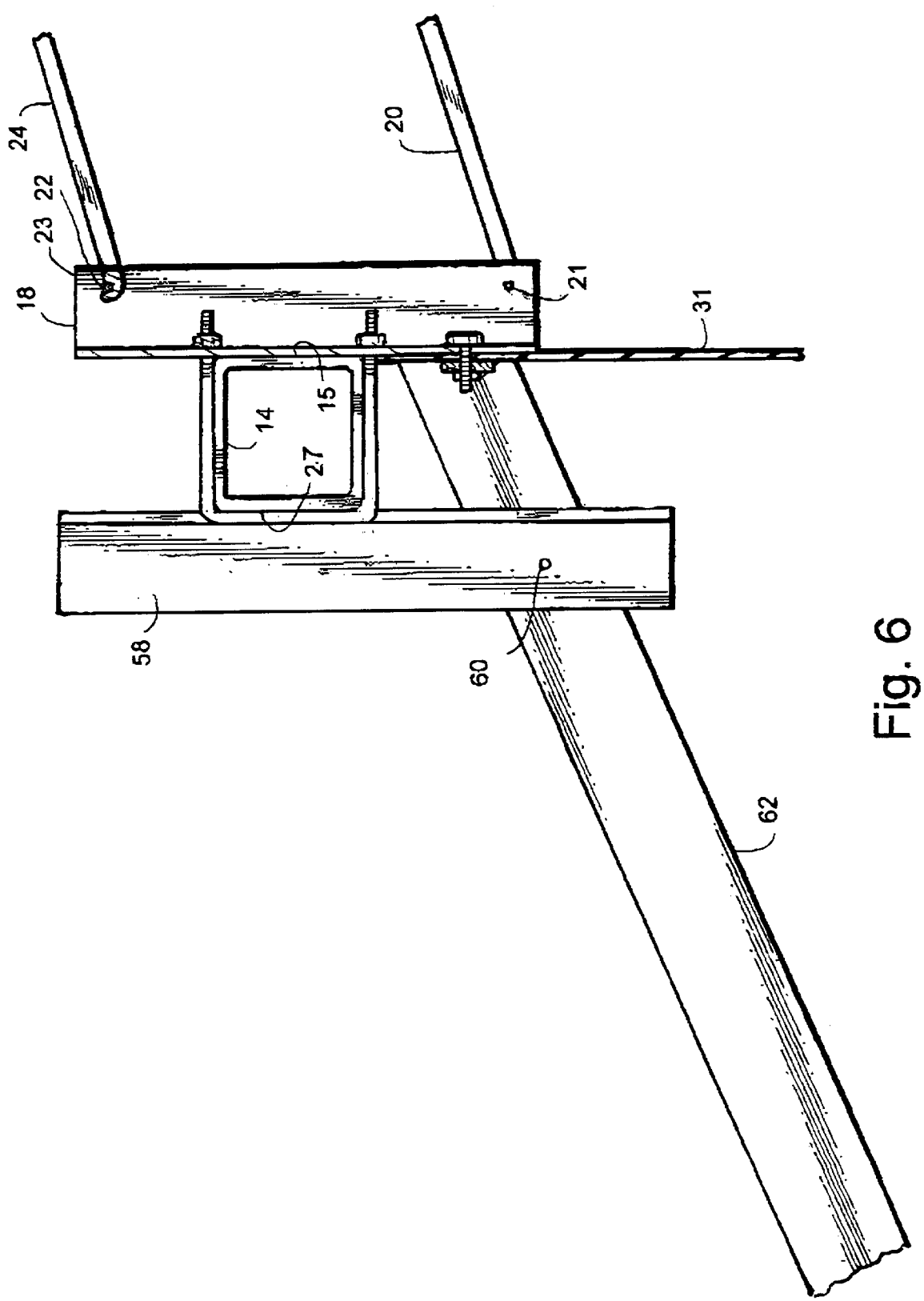
FIG. 6 is an opposite fragmentary sectional end view, taken along the section line 6—6 of FIG. 2.

Apparatus, generally designated 10, constructed according to the present invention, is particularly adapted for crushing crop residue, such as corn stalks S, disposed in a plurality of laterally spaced apart rows R, into a plurality of smaller stalk segments S2 and S3. The apparatus 10 includes a frame, generally designated 12 which comprises a transversely disposed, hollow tubular steel cross-beam 14 which is square in cross-section and has a front face 15. A three point coupling, generally designated 17 is centrally mounted on the front face 15 and includes a first pair of centrally located, laterally spaced-apart, upstanding, laterally outer, upstanding angle irons 16 and a pair of less spaced-apart upstanding central angle irons 18. The angle irons 16 and 18 are coupled to the cross beam 14 via U-bolts, generally designated 19.

Figure 8:
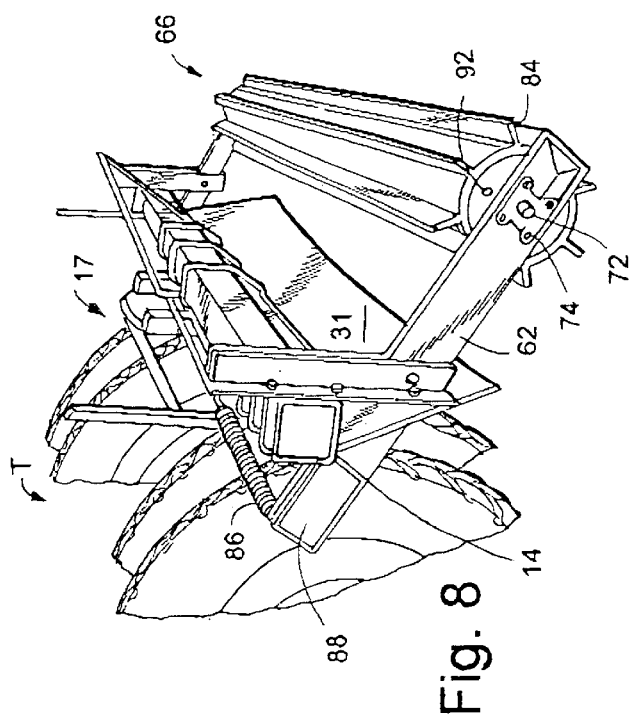
FIG. 8 is a rear perspective view thereof mounted on a tractor.
Figure 9:
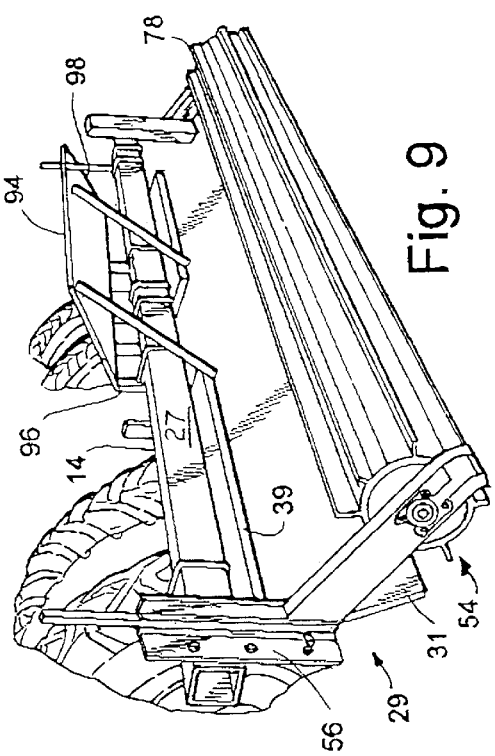
FIG. 9 is a slightly different rear perspective view thereof.
Figure 7:
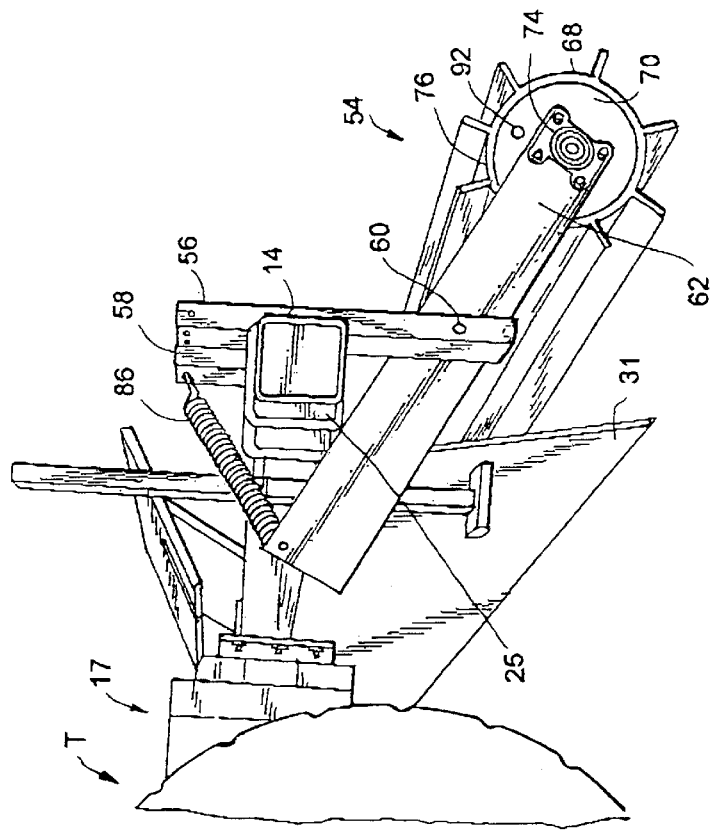
FIG. 7 is a front perspective view of the apparatus, constructed according to the present invention, mounted on a draft vehicle such as a tractor.
Figure 11:
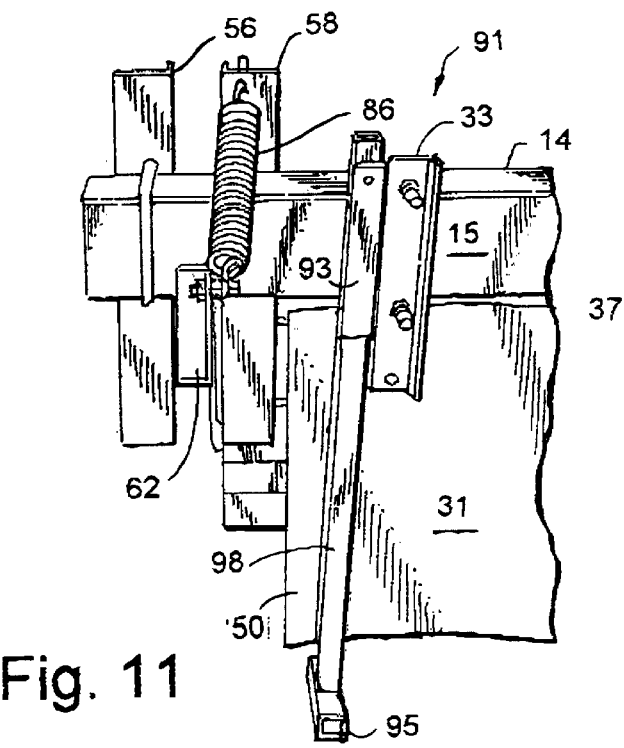
FIG. 11 is an enlarged front elevational view of an opposite end portion of the apparatus.
Figure 10:
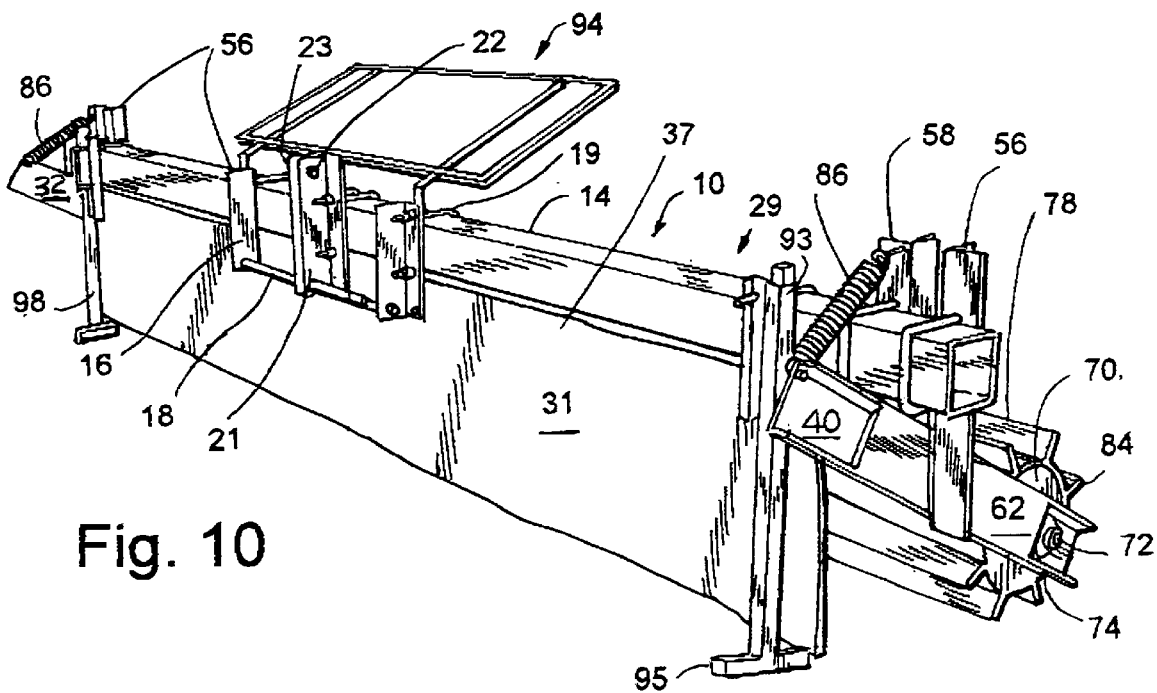
FIG. 10 is a front perspective view of the apparatus constructed according to the present invention, removed from the tractor in a stowed on the storage stand illustrated in FIG. 5.

Spanning the lower ends of the adjacent ones of angle irons 16 and 18 is a pair of lower draw pins 21 to which a pair of laterally spaced-apart tractor mounted lower draw hitches 20 are detachably coupled. The upper ends 23 of the central pair of angle irons 18 are spanned by a centrally disposed, horizontal, upper draw pin 22 to which the tractor mounted centrally disposed upper draw hitch 24 is detachably coupled. The draw hitches 20 and 24 are frequently referred to as a "three point hitch" mounted on a tractor T, for raising and lowering the frame 12 between a raised, inoperative transport position, illustrated in FIGS. 7, 8 and 9 and a lowered ground engaging operative position illustrated in FIG. 1.

Figure 12:
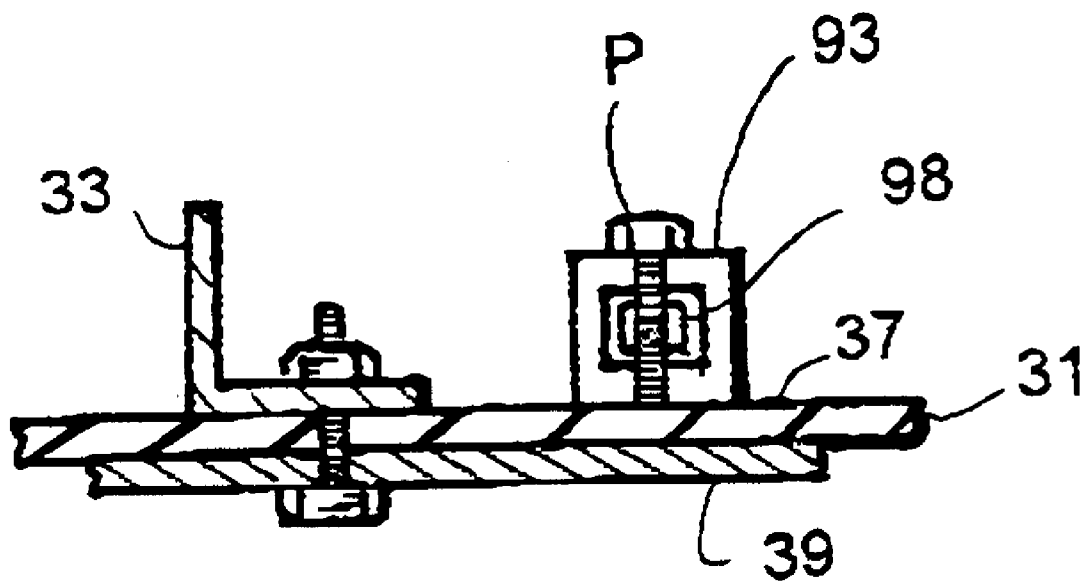
FIG. 12 is an enlarged top plan sectional view taken along the section line 12—12 of FIG. 3.

Dependently mounted on the hollow cross beam 14 is crop residue knock-down apparatus, generally designated 29, including a relatively heavy transversely disposed drape or curtain 31 made from resilient material such as rubber belting. The drape may typically be ½" thick and is of sufficient length to span several corn stalk rows R. The crop residue knock-down apparatus 29 includes a pair of laterally outer, upstanding, drape mounting angle irons 33 coupled to the front face 15 of the tubular bar 14 via U-bolts 35A. The upper transversely extending edge portion 37 of the rubber drape 31 is sandwiched between, and suspended from, a pair of horizontal cross bars 39 and the lower ends of the angle irons 16, 20 and 33. (See FIG. 12.)

Following the harvesting of the corn, the remaining upstanding stalks S, having ground embedded roots 51, must be severed from the roots 51 and crushed. The knock-down apparatus 29 is particularly adapted for knocking down upstanding crop residue, such as corn stalks S, to separate the stalks S from the roots 51 and break the stalks S into smaller stalk segments S2 and S3. As the frame 12 moves forwardly, in the direction of the arrow 41, the lower end 43 of drape 31 will forwardly bend the stalks S, in the direction of the arrow 45, toward the ground G. The dry and brittle stalks S are typically broken off at 53 from the underlying ground-embedded roots 51 and fall to the ground as illustrated as S1.

Stalk crushing apparatus, generally designated 54, is mounted on the frame 12 for breaking the knocked down stalks S1 into smaller stalk segments S2 and S3. The apparatus 54 is mounted on each laterally outer end 25 of the rear face 27 of the tubular frame bar 14 by a pair of laterally spaced-apart upstanding angle irons 56 and 58 spanned by a shaft 60.

Pivotally mounted on each shaft 60 is a longitudinally extending rocker arm 62. Spanning the rear ends 64 of the laterally spaced-apart rocker arms 62 is a hollow stalk crushing drum roller, generally designated 66, for crushing the broken corn stalks S1 into a plurality of smaller stalk segments S2 and S3.

The stalk crushing hollow drum roller 66 includes a hollow steel cylinder 67 having opposite ends 68 closed by end walls 70 which are fixed to a horizontal shaft 72 that is journaled on the rear ends 64 of rocker arms 62 via bearings 74. The cylinder 67 is of sufficient length to span several laterally spaced apart rows R of corn stalks S. Welded or otherwise suitably fixed to the smooth outer cylindrical surface 76 of hollow cylinder 68 is a plurality of solid steel, stalk crushing blades 78 which lie in planes 80 that intersect at a common junction such that the rotational axis 82 of the drum shaft 72 lies in each of the planes 80.

The terminal blade ends 84 may be sharpened if desired for engaging longitudinally spaced portions 86 of the broken off stalks S1 and pressing the stalks S1 into the earth or ground G until the resistance of the soil causes the stalks S1 to be crushed, broken and/or severed at 83 by the blade edges 84 into a plurality of smaller stalk segments S2 and S3. The smaller segments are more easily turned over when the ground G is subsequently plowed. If the soil is not plowed, as is typical in a no till farming operation, the stalk segments S2 and S3 will tend to prevent wind and water erosion of the soil. With the prior art flail choppers, the stalks are committed so finely that they easily blow away and don't protect the soil against erosion.

To detachably yieldably hold the stalk crushing drum roller 66 into frictional engagement with the ground G in rolling terrain having changes in elevation, such as schematically illustrated at G1, coil springs 86 span the upper ends of angle irons 58 and the front ends 88 of rocker arms 62. The coil springs 86 will allow the rocker arms 62 to swing upwardly, to the position illustrated in chain lines in FIG. 1, in response to changes in elevation (such as illustrated at G1) of the terrain or ground G being traversed. As the apparatus moves forwardly, in the direction of the arrow 41, the frictional engagement of the drum 68 and stalk crushing blades 78 engaging the ground G will cause the drum 66 to be self-propelled and rotated in the direction of the arrow 90 about the shaft axis 82 without the necessity of any other additional external rotary driving power. This construction will reduce the energy otherwise required to drive the chopper roller if it was coupled to a tractor driven power take off.

The stalk crushing drum 68 is water impervious and includes a detachably closure, such as a threaded plug 92, that can be removed to provide access for a hose to fill the cylinder 68 with water or liquid chloride to any desired level to adjust the weight of the roller. The outer cylindrical roller surface 76 will engage the ground G and will force any stones or rocks 67 lying on the earth's surface to be forced into the surface, as illustrated at 67A and thus inhibit the stones or rocks 67 from becoming subsequently inadvertently picked up by a harvester such as a combine.

The use of the added weight of the liquid chloride or water will aid in holding the roller 66 down against the soil to adjust for different soil conditions. Sand soil will require less weight to crush the stalks and clay soil would require more weight to accomplish the same purpose.

A safety screen, generally designated 94 is mounted on the cross beam 14 via suitable braces 96 and 98. The safety screen 94 may comprise expanded metal and is centrally located on the frame 12 and the transversely disposed frame bars 39 by frame bars 71 and 73 to preclude any debris from being inadvertently forwardly propelled onto the farmer driving the tractor T.

Also mounted on the laterally outer ends of the beam 14 is a pair of frame support stands, generally designated 91, each having an upper vertically disposed tube 93, fixed to the front face 15 of beam 14, and a lower rod 98 telescopically received therein. The lower rod 98 mounts a lower ground-engageable foot 95 on which the apparatus 10 is supported when it is removed from the tractor T. The telescoping tube 93 and rod 98 include a plurality of apertures which can be vertically moved into horizontal alignment and detachably coupled in any selected one of a plurality of vertically spaced positions by locking pins P. The foot 95 can be moved upwardly to a position removed from the ground when the device is coupled to the tractor.

The Operation and Method

The apparatus, generally designated 10, is mounted on the tractor T via the three point hitch 20, 24 and 17. The tractor T will move the device 10 into a field in the raised inoperative position illustrated in FIGS. 7–9. The corn stalks S will be the crop residue remaining after any corn thereon has been harvested. The stalks S can extend several feet above the ground G and thus can, if not removed, interfere with the subsequent harvesting of a following crop.

In the field the apparatus, generally designated 10, is lowered to a ground engaging position illustrated in FIG. 1 and pulled behind the tractor T over the ground G. The lower edge 43 of heavy resilient drape 31 will tend to be rearwardly deflected by the stalks S and will rearwardly swing, in the direction of arrow 45A, to forwardly swing and bend the stalks S in the direction of the arrow 45. The stalks S, which are typically dry and brittle, will typically be broken off at the level 53, from the ground embedded roots 51 and the lower end 43 of the knock-down curtain 31 will pass over the knocked-down broken off stalks S1. If, for some reason, some of the stalks S do not break off, the knock-down apparatus will still forwardly substantially bow the stalks so that they are at a better angle of attack by the crusher roller than they otherwise would be.

As the machine moves forwardly, the transversely extending stalk crushing roller 66 which is self-propelled, and stalk crushing blades 78 will traverse the stalks S to break, crush and cut the stalks S1 into a plurality of reduced pieces or segments S2 and S3 for dispatch to the top surface of the ground to prevent soil erosion or for subsequent plowing underground.

As the machine, frame 12, moves forwardly, the springs 86 will yieldably urge the rocker arms 52 to swing in a direction to urge the stalk crushing drum 66 downwardly against the ground G to insure that the drum 66 is rotatably driven about the drum axis 82. As the stalk crushing drum 66 passes over ground G1 of a higher elevation, the rocker arms and stalk crushing drum 66 will swing upwardly to the position illustrated in chain lines in FIG. 1 but will remain in bearing engagement with the ground G1 to continue to be self-propelled.

It is to be understood that the drawings and descriptive matter are in all cases to be interpreted as merely illustrative of the principles of the invention, rather than as limiting the same in any way, since it is contemplated that various changes may be made in various elements to achieve like results without departing from the spirit of the invention or the scope of the appended claims.

What I claim is:

1. Apparatus for crushing plant residue remaining in a field, having a contoured terrain with varying elevations, following a crop harvest, said apparatus comprising:
   a main frame;
   means for coupling said main frame to a draft vehicle for movement therewith in a forward path of travel and for vertical movement relative thereto between raised and lowered positions;
   plant residue knock-down means on said frame for downwardly knocking the plant residue to the contoured terrain as said frame is forwardly moved;
   a residue crushing roller mounted on said frame rearwardly of said plant residue knock-down means for free rotation about a first transverse axis; and
   sub-frame means mounting said residue crushing roller on said main frame for substantially continuous engagement with the contoured terrain being traversed;
   said sub-frame means including means mounting said crushing roller for vertical movement relative to said knockdown means between a raised ground engaging position and a lowered terrain engaging position, as said roller negotiates terrain of varying elevations, for self-propelled rotation about said first axis upon engaging the ground and crushing any plant residue knocked down by said plant residue knock-down means as said frame moves in the forward path of travel.

2. The apparatus set forth in claim 1 wherein said knockdown means comprises a transversely disposed curtain draped on said frame.

3. The apparatus set forth in claim 1 wherein said residue crushing roller comprises a hollow transverse drum of a predetermined transverse length and rotatable about said first axis, and a plurality of circumferentially spaced, transversely extending residue crushing blades extending substantially said transverse length of said drum.

4. The apparatus set forth in claim 3 wherein said blades lie in a plurality of circumferentially spaced radial planes intersecting said axis which lies in each of said planes.

5. The apparatus set forth in claim 1 wherein said residue crushing roller comprises a hollow water impervious drum having a transverse, hollow cylinder provided with opposite ends closed by a pair of transversely spaced end walls to define a liquid receiving cavity to be filled with liquid; and a plurality of radially extending, transversely disposed, circumferentially spaced crusher blades mounted on said cylinder.

6. The apparatus set forth in claim 5 wherein said cylinder is a continuous solid to downwardly press any field stones remaining on the surface of the terrain into the terrain to a position flush with the terrain as said apparatus is forwardly moved.

7. The apparatus set forth in claim 1 wherein said knockdown means comprises means for breaking the residue from any remaining ground embedded roots as the residue is knocked down.

8. The apparatus set forth in claim 1 wherein said sub-frame means comprises pivotal sub-frame members pivotally mounted on said main frame; and including yieldable means reacting between said pivotal sub-frame members and said frame for yieldably urging said residue crushing roller downwardly toward the terrain.

9. The apparatus set forth in claim 8 wherein said sub-frame means comprises a pair of laterally spaced-apart pivotal mounting bars, each having a forward end and a rear end; said residue crushing roller being rotatably mounted on said rear ends of said bars; means swingably mounting said bars on said frame for pivotal movement about a second transverse axis disposed between said forward and rear ends.

10. The apparatus set forth in claim 9 wherein said yieldable means comprises resilient means coupled between said frame and at least one of said forward ends of said pivotal mounting bars.

11. Apparatus for in-situ crushing plant residue, remaining in a field of varying terrain following crop harvest, into a plurality of smaller plant residue segments comprising:
    a frame;
    means for mounting said frame on a draft vehicle for forward movement therewith in a forward path of travel and for vertical movement relative thereto between a raised inoperative position and a lowered operative position;
    plant residue knock-down means on said frame for downwardly knocking the plant residue to the terrain as said frame is forwardly moved in said lowered operative position;
    a terrain engageable, plant residue crushing roller, rotatable about a transverse axis transverse to the forward path of travel, disposed rearwardly of said knock-down means for downwardly crushing the plant residue toward the terrain as said frame is moved forwardly in said lowered operative position; and
    means yieldably mounting said plant residue crushing roller for vertical movement on said frame in said lowered operative position relative to said frame and said knock-down means in response to changes in elevation of the terrain to detachably yieldably hold said roller in frictional engagement with the terrain to frictionally rotatably drive said roller about said axis as the frame moves forwardly.

12. The apparatus set forth in claim 11 wherein said roller comprises a drum having a plurality of circumferentially spaced, radially extending crushing blades thereon for downwardly crushing the debris toward the terrain into a plurality of smaller segments.

13. The apparatus set forth in claim 12 wherein said drum is a hollow water impervious cylinder having a port therein for receiving liquid.

14. The apparatus set forth in claim 11 wherein said roller includes a hollow drum having a plurality of transversely extending debris crushing, transversely disposed solid blades for downwardly crushing any debris on the terrain in said forward path of travel.

15. The apparatus set forth in claim 11 wherein said roller comprises a hollow drum having a plurality of radially outwardly extending, circumferentially spaced blades thereon each having a radially outer transversely extending debris chopping edge for chopping debris on the terrain in said forward path of travel.

16. The apparatus set forth in claim 11 wherein said plant residue knock-down means on said frame comprises means, spaced forward of said plant residue crushing roller for breaking any plant residue apart from any terrain embedded roots attached to the residue as said frame moves in the forward path of travel.

17. The apparatus set forth in claim 16 wherein said plant residue knock-down means comprises a transversely extending curtain draped on said frame forwardly of said plant residue crushing roller.

18. The apparatus set forth in claim 11 wherein said means yieldably mounting said plant residue crushing roller on said frame includes sub-frame means, pivotally mounted on said frame, and yieldable means reacting between said sub-frame and said frame; said roller being rotatably mounted on said sub-frame means for vertical movement therewith and for rotational movement relative thereto.

19. The apparatus set forth in claim 18 wherein said sub-frame means comprises a pair of laterally spaced-apart pivotal mounting bars each having forward and rear ends; said roller being pivotally mounted on said rear ends of said bars; means swingably mounting said bars on said frame for pivotal movement about a second transverse axis between said forward and rear ends.

20. The apparatus set forth in claim 19 wherein said yieldable means comprises resilient means coupled between said frame and at least one of said forward ends of said pivotal mounting bars.

21. Apparatus for in-situ crushing upstanding crop stalks having ground embedded roots following harvesting of any crop which grew on the stalks, said apparatus comprising:
 a main frame adapted to be supported on the ground for movement in a longitudinally forward path of travel;
 transversely disposed stalk knock-down means on said frame for breaking the stalks apart from the ground embedded roots and knocking the stalks to the ground, as said frame moves in said forward path of travel; and
 transversely disposed roller crusher means mounted on said frame rearwardly of said stalk knock-down means for downwardly crushing, toward the ground, the stalks knocked to the ground by said stalk knock-down means and breaking the stalks into a plurality of reduced stalk segments.

22. The apparatus set forth in claim 21 wherein said stalk knock-down means comprises a transversely extending drape suspended on said main frame forwardly of said roller crusher means.

23. The apparatus set forth in claim 21 wherein said stalk knock-down means includes a portion which is longitudinally yieldable relative to said frame.

24. The apparatus set forth in claim 23 wherein said knock-down means is resilient.

25. The apparatus set forth in claim 21 wherein said knock-down means is swingably moveable on said main frame in a forward and rearward path, relative to said frame, as said frame moves forwardly and said knock-down means passes over said stalks.

26. The apparatus set forth in claim 21 wherein said roller crusher means comprises a hollow, transverse cylinder, rotatable about a first transverse axis, having a continuous cylindrical outer surface, said plurality of blades being disposed on circumferentially spaced-apart portions of said continuous cylindrical outer surface.

27. The apparatus set forth in claim 26 wherein said cylinder includes opposite ends and further comprising end walls closing said opposite ends to provide a liquid impervious enclosure.

28. The apparatus set forth in claim 21 including means mounting said roller crusher means for vertical movement relative to said main frame to maintain said roller crusher means in bearing engagement with the ground in varying terrain conditions.

29. The apparatus set forth in claim 28 wherein said roller crusher means comprises a hollow, transverse cylinder, rotatable about a first axis; said means mounting said crusher roller including sub-frame means yieldably mounting said cylinder for vertical movement on said main frame in response to changes in elevation of the ground being traversed to yieldably hold said cylinder in frictional engagement with the ground and frictionally rotatable drive said cylinder about said axis as said frame moves forwardly.

30. The apparatus set forth in claim 29 wherein said sub-frame means comprises a pair of longitudinally extending, laterally spaced-apart support bars, adapted to be received on opposite sides of a plurality of rows of stalks, pivotally mounted on said main frame.

31. The apparatus set forth in claim 30 wherein said support bars have front and rear ends, said cylinder being rotatably mounted on said rear ends, said bars being pivotally mounted on said main frame for rotation about a second transverse axis forward of said first axis; and means coupling said main frame to said front ends of said bars yieldably urging said cylinder toward the ground.

32. Apparatus for crushing the upstanding stalk residue in a plurality of longitudinally extending, laterally adjacent rows of stalks, which have ground embedded roots, following harvesting of any crop on the stalks, said apparatus comprising;
 a main frame adapted to be supported on the ground for movement in a forward path of travel;
 knock-down means mounted on said frame and spanning said plurality of laterally adjacent rows of stalks for downwardly concurrently pushing the upstanding stalks in several laterally adjacent rows to the ground as said frame forwardly moves;
 means on the frame rearwardly of the knock-down means for breaking the knocked down stalks into a plurality of smaller stalk segments comprising:
  a transversely extending rotary ground engageable crusher roller rearwardly spaced apart from said knock-down means for spanning said plurality of laterally adjacent rows of stalks; and
  a plurality of transversely disposed, radially outwardly extending, continuous crusher blades mounted on said crusher roller, and adapted to span said plurality of adjacent rows, for downwardly crushing spaced-apart portions of the stalks against the ground to concurrently break the stalks in several laterally adjacent rows of stalks into smaller stalk segments.

33. The apparatus set forth in claim 32 wherein said crusher roller comprises a hollow, transverse cylinder rotatable about a first transverse axis and having a cylindrical outer surface; said plurality of blades being disposed in circumferentially spaced-apart portions of said cylindrical outer surface.

34. The apparatus set forth in claim 33 wherein said blades are solid.

35. The apparatus set forth in claim 34 wherein said cylinder is water impervious and includes opposite ends; and water impervious end walls closing said opposite ends to provide a liquid impervious enclosure.

36. The apparatus set forth in claim 32 wherein said means for breaking the stalks includes means mounting said crusher roller for vertical movement relative to said main frame to maintain said crusher roller in bearing engagement with the ground in varying terrain conditions.

37. The apparatus set forth in claim 33 wherein said means for breaking the knocked-down stalks comprises sub-frame means yieldably mounting said cylinder for vertical movement on said main frame in response to changes in elevation of the ground being traversed to yieldably hold said cylinder in frictional engagement with the ground and frictionally rotatably drive said cylinder about said axis as said frame moves forwardly.

38. The apparatus set forth in claim 37 wherein said sub-frame means comprises a pair of longitudinally extending, laterally spaced-apart support bars, adapted to be received on opposite sides of a plurality of rows of stalks, pivotally mounted on said main frame.

39. The apparatus set forth in claim 38 wherein said support bars have front and rear ends, said cylinder being rotatably mounted on said rear ends, said support bars being pivotally mounted on said main frame for rotation about a second transverse axis forward of said first axis; and means coupling said main frame to said front ends of said bars yieldably urging said cylinder toward the ground.

40. The apparatus set forth in claim 38 wherein said knock-down means for pushing the upstanding stalks includes a transversely extending drape having an upper end suspended from said frame and a lower, free end for engaging and knocking down the stalks to the ground as said frame is moved forwardly.

41. The apparatus set forth in claim 40 wherein said drape comprises a resilient sheet of material for breaking the stalks from any underlying ground embedded roots as said frame forwardly moves.

42. The apparatus set forth in claim 32 wherein said knock-down means for downwardly pushing said stalks comprises a transversely extending drape having an upper end suspended from said frame and a lower free end for engaging and downwardly knocking the stalks to the ground as said frame forwardly moves.

43. The apparatus set forth in claim 32 wherein said knock-down means for downwardly pushing the stalks is spaced forwardly of said crusher roller by a transverse gap there-between.

44. The apparatus set forth in claim 43 wherein said knock-down means comprises a resilient sheet having
   an upper end mounted to said frame, and
   a lower suspended end swingably moveable relative to said upper end for forward and rearward movement relative to said upper end for breaking the stalks from any underlying ground embedded roots therein as the stalks are being downwardly pushed.

45. The apparatus set forth in claim 44 wherein said resilient sheet is adapted to span said plurality of rows of stalks.

46. The apparatus set forth in claim 32 wherein said knock-down means for downwardly pushing the stalks includes a drape on said frame, and means for dragging said drape over the upstanding stalk residue to downwardly push the stalks as the frame moves forwardly.

47. The apparatus set forth in claim 46 wherein said drape comprises a transversely disposed, resilient sheet having an upper end fixed to said frame and a lower free end longitudinally yieldable relative to said upper end.

48. Apparatus for in-situ breaking a crop stalk, which remains in a farm field following harvesting of any crop on the stalk, into a plurality of smaller stalk segments comprising:
   a main frame;
   means for coupling said frame to a draft vehicle for movement in a longitudinally forward path and for vertical movement relative thereto between a raised, inoperative position and a lowered stalk crushing position;
   a transversely extending, stalk knock-down drape having an upper end-mounted to said frame and a lower skirt end freely swingably moveable relative to said upper end for knocking the stalk to the ground as said frame, in said lowered stalk crushing position forwardly moves; and
   stalk crushing apparatus for crushing the knocked-down stalk into smaller stalk segments comprising:
      a transverse, liquid receiving drum having a hollow transversely disposed cylinder rotatable about a first axis, and
      a plurality of circumferentially spaced-apart transversely extending radially outwardly projecting crusher blades mounted on said cylinder for downwardly crushing spaced-apart stalk portions of the knocked-down stalk and forcing said spaced-apart stalk portions toward the ground to sever the stalk into a plurality of smaller stalk segments.

49. The apparatus set forth in claim 48 wherein said stalk crushing apparatus includes a sub-frame mounting said transverse drum on said main frame for vertical movement relative to said main frame in response to changes in the elevation of the ground being traversed and detachably maintain said transverse drum in frictional engagement with the ground to force said drum to rotate about said first axis as said frame is forwardly moved.

50. The apparatus set forth in claim 49 wherein said sub-frame means includes yieldable means yieldably urging said drum downwardly toward the ground relative to said main frame.

51. The apparatus set forth in claim 50 wherein said sub-frame comprises a pair of laterally spaced drum support bars having front and rear portions and intermediate portions between said front and rear portions, said drum being rotatably mounted on said rear ends, rearwardly of said stalk knock-down drape, for rotation about said first axis; said bars being pivotally mounted on said frame for swinging movement about a second transverse axis parallel to and forward of said first axis; and said yieldable means being coupled between said main frame and said front end portions to yieldably urge said drum downwardly toward the ground.

52. A machine for in-situ crushing upstanding aboveground crop residue having roots remaining embedded in the ground following a crop harvest, said machine comprising:
   a frame;
   means for coupling said frame to a draft vehicle for movement in a forward path of travel;
   non-rotary knock-down means mounted on said frame transverse to the forward path of travel for knocking down the upstanding crop residue to the ground; and
   a transversely disposed rotary roller crusher mounted on said frame rearwardly of said knock-down means for rotation about a transverse axis for downwardly crushing the knocked-down residue toward the ground to break the knocked down residue into smaller residue pieces.

53. The machine set forth in claim 52 wherein said non-rotary knock-down means includes means for breaking the residue from the roots thereof as the residue is being knocked to the ground.

54. The machine set forth in claim 52 wherein said roller crusher includes a transverse rotary drum of predetermined transverse length having a cylindrical periphery and a plurality of radially outwardly extending residue crushing blades circumferentially spaced-apart on said drum; and means mounting said roller crusher for vertical movement relative to said frame to allow said crusher roller to follow changes in elevation of the ground being traversed.

55. The machine set forth in claim 52 wherein said roller crusher comprises a hollow drum including transverse hollow cylinder having opposite ends and closure end walls mounted on said opposite ends, means in said drum for admitting liquid to said drum;
   a plurality of circumferentially spaced crusher blades mounted on said cylinder for crushing the knocked-down residue lying on the ground.

56. The machine set forth in claim 55 wherein said blades are solid and extend substantially the transverse length of said cylinder.

57. A method of in-situ crushing and breaking upstanding crop stalks, having underground roots following harvesting of any crop on the stalks, into a plurality of smaller stalk segments comprising the steps of:
   downwardly knocking the stalks to the ground and separating the stalks from the roots by means of dragging a transversely disposed rake in a longitudinal path of travel over the upstanding crop stalks; and
   thereafter downwardly crushing spaced-apart portions of the knocked down stalks toward the ground to break the stalks into a plurality of smaller stalk segments;
   said crushing step is accomplished by pulling a rotatable drum having a plurality of transversely spaced crusher blades in a rearwardly spaced relation to said drape, in a longitudinal path over the ground to frictionally rotate the drum about a transverse axis.

58. The method set forth in claim 57 including the step of yieldably holding the rotatable drum in frictional engagement with the ground while permitting vertical movement thereof in response to changes in elevation of the terrain as the drum is forwardly moved.

59. The method set forth in claim 58 including the step of selectively vertically moving said rotatable drum between an inoperative position removed from the ground and an operative, stalk crushing position engaging the ground.

60. The method set forth in claim 59 wherein said step of downwardly knocking the stalks to the ground and separating the stalks from the roots includes the step of concurrently knocking down a plurality of laterally adjacent elongate rows of stalks and said step of crushing includes the step of concurrently rolling over and crushing the knocked-down stalks in said laterally adjacent elongate row.

* * * * *